US005972454A

United States Patent [19]
Lee

[11] Patent Number: 5,972,454
[45] **Date of Patent: *Oct. 26, 1999**

[54] COMPOSITE NOTE PAD ASSEMBLY

[76] Inventor: Fei-Chen (or Victor) Lee, 4th Floor, No. 51, Sec. 2, Chung-Ching South Rd, Taipei, Taiwan

[ * ] Notice: This patent is subject to a terminal disclaimer.

[21] Appl. No.: 08/932,693

[22] Filed: Sep. 18, 1997

Related U.S. Application Data

[63] Continuation of application No. 08/643,189, May 6, 1996, Pat. No. 5,705,244.

[51] Int. Cl.[6] .................................. B32B 7/06; C09J 7/04

[52] U.S. Cl. ............................ 428/40.1; 40/641; 283/38; 283/63.1; 428/41.6; 428/41.8; 428/42.1; 428/42.2; 428/42.3; 428/194; 428/212; 462/55; 462/901

[58] Field of Search ................................. 428/40.1, 41.6, 428/41.7, 41.8, 42.1, 42.2, 42.3, 212, 194; 283/38, 63.1; 40/641; 462/901, 55

[56] References Cited

U.S. PATENT DOCUMENTS

| | | | |
|---|---|---|---|
| 5,153,041 | 10/1992 | Clements | 428/40.1 |
| 5,464,672 | 11/1995 | Jackson | 428/42.1 |
| 5,491,121 | 2/1996 | Kuchta | 428/537.5 |
| 5,705,244 | 1/1998 | Lee | 428/40.1 |

FOREIGN PATENT DOCUMENTS

| | | |
|---|---|---|
| WO 92/06852 | 4/1992 | WIPO . |

*Primary Examiner*—Nasser Ahmad
*Attorney, Agent, or Firm*—Ernest V. Linek; Banner & Witcoff, Ltd.

[57] ABSTRACT

Disclosed is a composite note pad assembly which comprises two independent stacks of individual sheets, sandwiched together, wherein the resulting composite pad assembly has a fall writing surface on both the top and the bottom of the assembly. In this manner, unlike conventional pads, there is no bottom of the stack, and there is no exposed glue surface which would otherwise interfere with writing or marking the paper, or which would get covered with office dirt and grime. The two-part composite pad assembly is unique, because it has two exposed writing surfaces at all times. In a preferred embodiment, the papers used to make the two segments of the composite pad assembly are different, e.g., different color, different appearance, etc., allowing the user the option of having two choices of "note" from a single pad assembly.

20 Claims, No Drawings

COMPOSITE NOTE PAD ASSEMBLY

This is a continuation of application Ser No. 08/643,189 filed on May 6, 1996 now U.S. Pat. No. 5,705,244.

BACKGROUND OF THE INVENTION

The present invention relates to improvements in note pads and particularly to improvements in the types of note pads having sheets of repositionable adhesive on a portion of each sheet so that one or more sheets can be easily removed from the pad and secured to another surface. Such pads in general are manufactured, for example, by the 3M Company under the trademark of "Post-It Notes."

INFORMATION DISCLOSURE

Paper pads made up of a plurality of repositionable sheets of the prior art are well known and are conventionally of rectangular shape and come in a variety of sizes and colors. A user will typically make a pen or pencil notation on the upper sheet which is then removed and placed upon some other surface such as a file or other sheet of paper. The present inventor is aware of one multi-color pad assembly, sold under the Post-It trademark. This pad comprises a stack of three or more colored segments of paper in the pad assembly, including yellow, red, blue, etc. However, this pad neither teaches nor suggests the present invention, as discussed in greater detail below.

All of the known prior art pads, including them multi-color pad described above are, unless the pad is broken up into separate multi-page units, used in one direction, i.e., from the top of the pad downward to the backing paper at the bottom of the stack. The pads of the prior art are thus "one-way" pads, whereas the pad of the present invention is a "two-way" pad.

SUMMARY OF THE INVENTION

The present invention is directed to a composite note pad comprising a plurality of paper sheets stacked to form a pad assembly wherein the composite pad assembly comprises two independent stacks of individual sheets, each sheet in said stacks including one surface with a border coated with a repositionable adhesive; and wherein the resulting composite pad assembly affords a full writing surface at both fie top and the bottom of the assembly.

In one preferred embodiment of the present invention, the composite note pad assembly comprises two independent stacks of individual sheets, sandwiched together at some predetermined position; the resulting composite pad assembly having a full writing surface on both the top and the bottom of the assembly. In this manner, unlike conventional pads, there is no bottom of the stack, and there is no exposed glue surface which would otherwise interfere with writing or marking the paper, or which would get covered with office dirt and grime. The two-part composite pad assembly is unique, because it has two exposed writing surfaces at all times.

In another preferred embodiment of the present invention, the composite pad assembly is uniquely attractive and aesthetically pleasing, particularly when compared to the traditional yellow pads of the prior art. This is accomplished by providing a composite note pad of the present invention wherein the segments of repositionable sheets are of two different colors for the two parts of the assembly, with either a 50%—50% split in the colors; a 60%–40% split; a 75%–25% split; a 90%–10% split, each representing just some of the optional choices available with a two color system. If additional colors are employed, these values would change accordingly.

With the composite pad assembly of the present invention, routine memos can be made on the conventional "yellow" colored note paper, whereas more important notes or memos would be made on paper having a more vibrant color, e.g., "neon red," "neon blue," "neon green," or the like. The need to have more than one colored pad on one's desk is thus eliminated by this invention; and the ability to highlight memos over the traditional yellow message pad is made readily available. Similarly, the need to take apart the prior art multi-color Post-It pad assembly is also eliminated. Experience shows that once a pad assembly has been taken apart, it is usually difficult to reunite the pieces into a cohesive unit. Thus, once the multi-color Post-It pad is taken apart, the user is left with a plurality of single color, one-way note pads, each with a bottom piece with an exposed adhesive border, which quickly picks up office debris. Unfortunately, many people decide to throw away the entire pad at this stage.

In addition to using at least two different color papers to make up the composite stack of the present invention, other combinations are feasible and contemplated as being part of the present invention; for instance, one part of the stack can comprise a plain paper note paper (white, yellow, red, blue, green, etc.) while the other part of the pad can include lines for ease of memo writing, or educational or inspirational statements, or other graphic displays. Such alternative embodiments are also part of this invention.

DESCRIPTION OF THE PREFERRED EMBODIMENT

As described above, the present invention comprises at least two repositionable note pads, stuck together at some point therebetween, whereby each side of the pad presents a writing surface.

Thus, the present invention is directed to a composite note pad assembly which comprises two independent stacks of individual sheets, sandwiched together, wherein the resulting composite pad assembly has a full writing surface on both the top and the bottom of the assembly. In this manner, unlike conventional pads, there is no bottom of the stack, and there is no exposed glue surface which would otherwise interfere with writing or marking the paper, or which would get covered with office dirt and grime. The two-part composite pad assembly is unique, because it has two exposed writing surfaces at all times. In a preferred embodiment, the papers used to make the two segments of the composite pad assembly are different, e.g., different color, different appearance, etc., allowing the user the option of having two choices of "note" from a single pad assembly.

The typical pad sizes which are contemplated by this invention include the 1.5"×2"sheets, the 3"×3"sheets; the 3"×5"sheets, and even larger sizes. Each portion of the pad comprises a stack of individual sheets that are of substantially the same size. One edge of each sheet is coated with an adhesive which permits the sheets to be reasonably bound to each other to form a portion of the composite pad. The back surface of each sheet has a border of repositionable adhesive which extends substantially the entire width of the back surface of each sheet. Such adhesives are well known in the art. See for instance U.S. Pat. Nos. 4,166,152, 5,109,083 and 5,194,329, the disclosures of which are hereby incorporated herein by reference.

Each sheet in the two stacks comprising the pad assembly has a border on the back surface thereof, said border having repositionable adhesive so a removed sheet can be applied to another surface. The adhesive border typically is less than ⅓ the length of the pad, preferably less than about ¼ the length of the pad, but can vary depending upon the size of the sheets making up the pad. The adhesive border typically extends across the width of the pad, but again, this can be varied if desired. The adhesive border need only be large enough (length and width) to hold the individual sheets of the pad together.

Preferably, the two individual stacks of the composite pad are mated with the adhesive border strips in the same general location, so that the removal of each paper piece is always in the same direction. However, if desired, the stacks can be mated so that they are removed in opposite directions, or, if the sheets are square in shape, the strips can be at angles of 90°.

The prior art pads typically use a backing page to protect the last adhesive border from collecting dirt and becoming useless. Often however, this backing sheet falls off, allowing the bottom of the stack, with its exposed adhesive surface, to collect large amounts of dirt and dust. If desired, the present invention can also employ such a backing paper, but in this case, it is located between the two removable stacks which make up the composite assembly. Such a backing paper is not necessary however, because when the two innermost sheets meet, either adhesive-to-adhesive or not, they stick quite readily, forming the desired two part composite pad assembly.

The pads of this invention can be readily assembled by hand, and can likewise be assembled by modifying the manufacturing equipment currently used to manufacture the prior art pads. Such modifications are believed to be within the ordinary skill of the artisans who currently manufacture such pads, and as such are not believed to be necessary herein.

Having thus described the invention with particular reference to the preferred forms thereof, it will be obvious that various changes and modifications may be made therein without departing from the spirit and scope of the invention as defined in the appended claims.

What is claimed is:

1. A composite note pad comprising a plurality of paper sheets stacked to form a pad assembly wherein:

the composite pad assembly comprises two independent stacks of individual sheets, each sheet in said stacks including one surface with a border coated with a repositionable adhesive, wherein said adhesive borders are aligned at 90 degrees or spaced apart at 180 degrees through the stack; and the resulting composite pad assembly has a full writing surface at both the top and the bottom of the assembly.

2. The composite note pad of claim 1, wherein the two independent stacks are sandwiched together at approximately the middle of the pad assembly.

3. The composite note pad of claim 1, wherein a backing page divides the two stacks of the pad assembly.

4. The composite note pad of claim 1, wherein there is no exposed adhesive surface in the pad assembly.

5. The composite note pad of claim 1, wherein the stacks of repositionable sheets are of two different colors for the two parts of the assembly.

6. The composite note pad of claim 5, wherein the stacks of repositionable sheets are divided in a 50%—50% split in the colors.

7. The composite note pad of claim 5, wherein the stacks of repositionable sheets are divided in a 60%–40% split in the colors.

8. The composite note pad of claim 5, wherein the stacks of repositionable sheets are divided in a 75%–25% split in the colors.

9. The composite note pad of claim 5, wherein the stacks of repositionable sheets are divided in a 90%–10% split in the colors.

10. The composite note pad of claim 5, wherein one of the colors is a neon color.

11. A composite note pad comprising a plurality of paper sheets stacked to form a pad assembly wherein:

the composite pad assembly comprises two independent stacks of individual sheets, each sheet in said stacks including one surface with a border coated with a repositionable adhesive, wherein said adhesive borders are through the stack; and the resulting composite pad assembly has a full writing surface at both the top and the bottom of the assembly;

wherein one part of the stack comprises a plain paper note paper while the other part of the pad includes graphical material selected from the group consisting of spaced apart lines for writing, educational or inspirational statements or graphic displays.

12. The composite note pad of claim 11, wherein the two independent stacks are sandwiched together at approximately the middle of the pad assembly.

13. The composite note pad of claim 11, wherein a backing page divides the two stacks of the pad assembly.

14. The composite note pad of claim 11, wherein there is no exposed adhesive surface in the pad assembly.

15. The composite note pad of claim 11, wherein the stacks of repositionable sheets are of two different colors for the two parts of the assembly.

16. The composite note pad of claim 15, wherein the stacks of repositionable sheets are divided in a 50%—50% split in the colors.

17. The composite note pad of claim 15, wherein the stacks of repositionable sheets are divided in a 60%–40% split in the colors.

18. The composite note pad of claim 15, wherein the stacks of repositionable sheets are divided in a 75%–25% split in the colors.

19. The composite note pad of claim 15, wherein the stacks of repositionable sheets are divided in a 90%–10% split in the colors.

20. The composite note pad of claim 15, wherein one of the colors is a neon color.

* * * * *